United States Patent
Armando et al.

(10) Patent No.: US 6,832,631 B2
(45) Date of Patent: Dec. 21, 2004

(54) PROPORTIONAL VALVE ASSEMBLY, PARTICULARLY FOR SUPPLYING COMPRESSED AIR ON A GLASSWARE MOLDING MACHINE

(75) Inventors: Lorenzo Armando, Cuneo (IT); Gianclaudio Borsarelli, Cuneo (IT); Carlo Sesia, Cuneo (IT); Bruno Viada, Madonna Delle Grazie (IT)

(73) Assignee: Bottero S.p.A. (IT)

( * ) Notice: Subject to any disclaimer, the term of this patent is extended or adjusted under 35 U.S.C. 154(b) by 15 days.

(21) Appl. No.: 10/197,311

(22) Filed: Jul. 16, 2002

(65) Prior Publication Data
US 2003/0034077 A1 Feb. 20, 2003

(30) Foreign Application Priority Data

Jul. 17, 2001 (IT) ..................................... TO2001A0700

(51) Int. Cl.[7] ............................................. F16K 11/07
(52) U.S. Cl. ............................. 137/625.65; 251/129.08
(58) Field of Search ................. 137/625.65; 251/129.08

(56) References Cited

U.S. PATENT DOCUMENTS

| | | | | |
|---|---|---|---|---|
| 4,446,888 A | * | 5/1984 | Heredia de la Paz et al. | 137/625.65 |
| 4,711,269 A | * | 12/1987 | Sule | 137/625.65 |
| 4,719,944 A | * | 1/1988 | Cleasby | 137/625.65 |
| 5,417,241 A | | 5/1995 | Tischer et al. | |
| 5,658,057 A | * | 8/1997 | Ohnuma et al. | 303/119.2 |
| 5,727,851 A | * | 3/1998 | Ohkubo et al. | 303/119.2 |
| 5,918,630 A | | 7/1999 | Lucas et al. | |
| 6,481,332 B2 | * | 11/2002 | Anderson | 137/625.65 |

FOREIGN PATENT DOCUMENTS

DE       35 07 278       9/1986

* cited by examiner

*Primary Examiner*—Gerald A. Michalsky
(74) *Attorney, Agent, or Firm*—Ostrolenk, Faber, Gerb & Soffen, LLP

(57) ABSTRACT

In a proportional valve assembly, particularly for supplying compressed air on a glassware molding machine, a tubular body, having an axis and air inlet and outlet ports, houses a slide member which is slid axially along the axis, to open and close the inlet and outlet ports, by a linear actuator, on the one hand, and, on the other, by the reaction exerted by an elastic body and the compressed air; the elastic body being spaced apart from the slide member and connected to the slide member by a relatively moving device.

14 Claims, 1 Drawing Sheet

PROPORTIONAL VALVE ASSEMBLY, PARTICULARLY FOR SUPPLYING COMPRESSED AIR ON A GLASSWARE MOLDING MACHINE

The present invention relates to a proportional valve assembly, particularly for supplying compressed air on a glassware molding machine.

BACKGROUND OF THE INVENTION

In the glass industry, hollow glass articles are produced on so-called I.S. molding machines, which comprise a number of air-powered operating units, at least some of which are supplied and controlled by respective proportional valve assemblies.

In most applications, the proportional valves comprise an elongated outer jacket in which the inlet, outlet, and exhaust ports are formed; and a sleeve housed in the jacket and comprising a number of projections mating in fluidtight manner with the inner surface of the jacket.

To open/close the various ports, the sleeve is normally moved axially inside the jacket by an electric linear actuator, on the one hand, and, on the other, by a reaction defined by the combined action of a spiral return spring and the pressurized fluid supplied by the valve assembly. The spring normally comprises an end portion inserted inside a seat in the jacket; and an opposite end portion fitted to an axial projection integral with the sleeve.

Though widely used on conventional molding machines, known valve assemblies of the above type fail to meet the requirements of modern glassware molding machines in terms of response speed and repeat positioning. This is due to the reaction exerted on the sleeve not always being purely axial, and in many cases—due to machining, positioning and assembly tolerances and/or deformation under load—comprising a radial component varying uncontrollably in direction and intensity. The presence of components crosswise to the traveling direction of the sleeve affects the slide resistance of the sleeve inside the jacket, and produces localized wear which impairs response time, sealing, and operating precision, and which obviously increases alongside an increase in fluid supply pressure.

SUMMARY OF THE INVENTION

It is an object of the present invention to provide a proportional valve assembly designed to provide a straightforward, low-cost solution to the above drawbacks.

According to the present invention, there is provided a proportional valve assembly, particularly for supplying compressed air on a glassware molding machine, the assembly comprising a tubular body having an axis and inlet and outlet ports for an operating fluid; at least one movable slide member housed in said tubular body; a linear actuator for exerting control action on said slide member; and reaction means for exerting on the slide member an opposing action in opposition to the control action, and for moving said slide member along said axis; characterized by also comprising relatively moving means interposed between said reaction means and said slide member.

BRIEF DESCRIPTION OF THE DRAWINGS

With reference to the accompanying drawings showing a section of a preferred embodiment of the proportional valve assembly according to the teachings of the present invention.

DETAILED DESCRIPTION OF THE INVENTION

Figure 1:
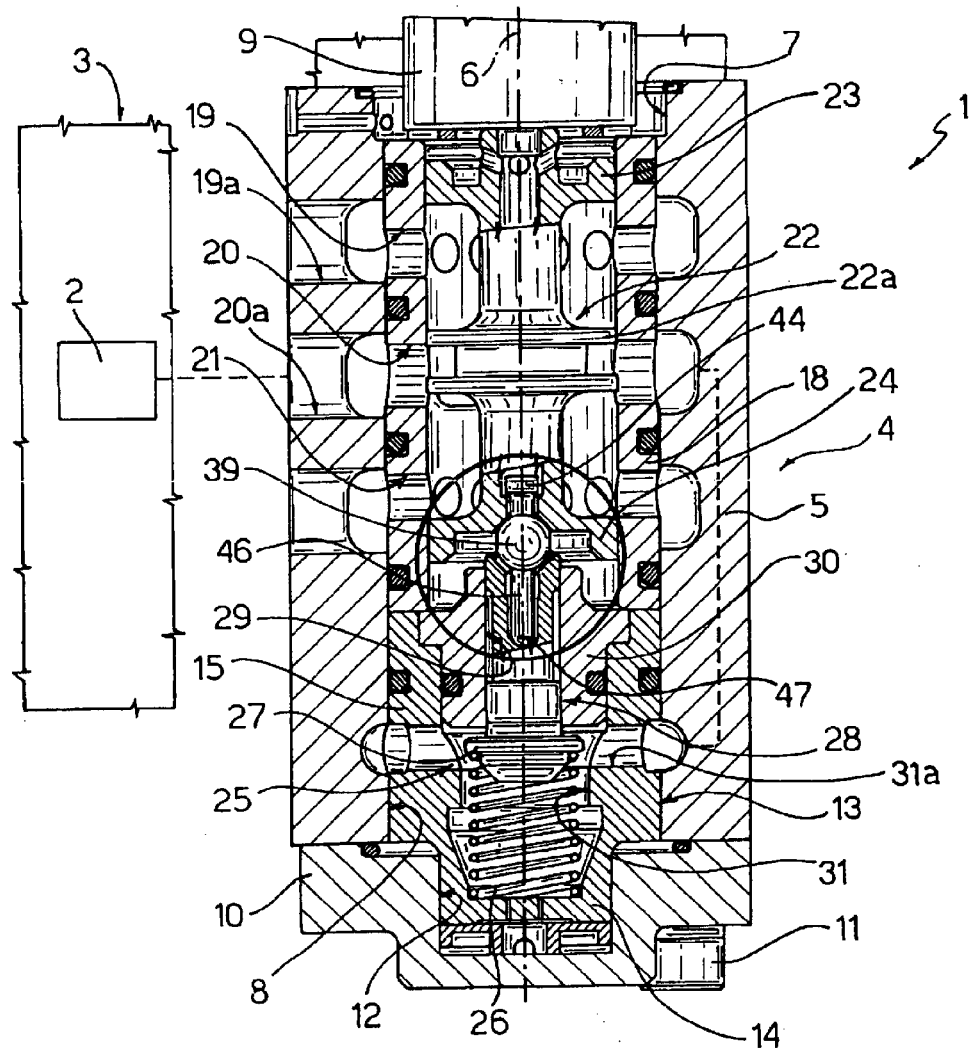
FIG. 1 is a section of a preferred embodiment of the proportional valve assembly.
Figure 2:
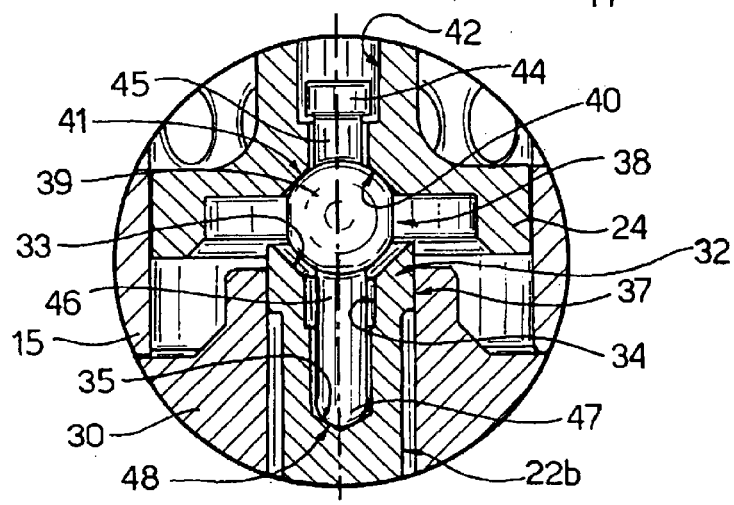
FIG. 2 is an enlargement of the encircled portion of FIG. 1.

Number 1 in the accompanying drawing indicates a proportional valve assembly for supplying compressed air to an operating unit 2 of a machine 3 for molding hollow glass articles.

Valve assembly 1 comprises an outer casing 4 in turn comprising a cylindrical tubular body 5 having a longitudinal axis 6, and two opposite axial openings 7 and 8; opening 7 is closed in fluidtight manner by a known electric linear actuator 9 extending coaxially with axis 6; and opening 8 is closed in fluidtight manner by an end cap 10 connected integrally to body 5 by a number of screws 11.

Cap 10 defines a cylindrical inner dead seat 12 which extends coaxially with axis 6 and is engaged by an end portion of a cup-shaped body 13, a bottom wall 14 of which rests on cap 10, and a lateral wall 15 of which extends inside body 5 and mates with body 5 in fluidtight manner.

Cup-shaped body 13 is clamped against cap 10 by a further tubular body or liner 18 of valve assembly 1. Liner 18 is also housed inside body 5, extends along the remaining length of body 5, coaxially with axis 6, mates with body 5 in fluidtight manner, and comprises a number of fluid inlet openings 19 communicating with respective fluid feed conduits 19a formed in body 5; a number of outlet openings 20 communicating with an outlet conduit 20a formed through body 5 and for supplying compressed fluid to operating unit 2; and a number of exhaust openings 21.

A known slide 22 slides axially in opposite directions inside liner 18, and comprises a number of radial projections 22a for opening/closing openings 19, 20 and 21; an end portion 23 resting directly against the movable output member of electric linear actuator 9; and an opposite end portion 24 facing cup-shaped body 13 and connected to a reaction assembly 25 for only exerting axial actions in opposition to those exerted by linear actuator 9.

As shown in the accompanying drawing, assembly 25 comprises a spring 26 housed, coaxially with axis 6, in the cavity of cup-shaped body 13, and having one end resting on wall 14, and the opposite end resting against the head 27 of a push rod 28 coaxial with axis 6. Push rod 28 comprises a cylindrical shank 22b having an outside diameter smaller than that of projections 22a and therefore smaller than the inside diameter of liner 18, and slides in opposite directions and in fluidtight manner inside a through hole 29, coaxial with axis 6, of a tubular guide 30. Guide 30 is housed partly and in fluidtight manner inside cup-shaped body 13, is clamped by liner 18 against a shoulder of cup-shaped body 13, and defines, together with push rod 28, guide 30, and cup-shaped body 13, a chamber 31 housing head 27 and spring 26, and communicating with outlet openings 20 via a conduit 31a.

Push rod 28 is separate and spaced apart from slide 22, projects axially from guide 30, and terminates, on the end facing slide 22, with a hollow elongated portion 32, which defines a conical end seat 33 open towards slide 22, and a dead axial cavity 34.

Dead cavity 34 extends from and communicates with conical seat 33, and is defined by a conical bottom surface defining a straight flared further conical seat 35 spaced axially apart from and having a wider flare than conical seat 33.

Push rod 28 forms part of a coupling device 37, which also comprises a coupling member 38 interposed between and separate from both slide 22 and push rod 28.

More specifically, coupling member 38 comprises an intermediate spherical head 39 partly and loosely engaging seat 33 and a further straight flared conical seat 40. Seat 40 is formed in end portion 24 of slide 22 and, together with conical seat 33, defines a self-leveling, spherical-headed articulated joint 41. Seat 40 communicates with a cavity 42 via a passage formed, coaxially with axis 6, in slide 22 and connected to cavity 42 by an inner annular shoulder. Cavity 42 houses a retaining head 44, which rests on said inner shoulder and is connected to head 39 by a rod 45 loosely engaging said passage and connected in known manner to head 44.

As shown in the accompanying drawing, member 38 also comprises a cylindrical push rod 46 engaging cavity 34 radially loosely, and which terminates with a hemispherical tip 47 smaller in outside diameter than head 39 and housed in seat 35 to define a further self-leveling, spherical-headed articulated joint 48 spaced axially apart from and in series with articulated joint 41.

In actual use, the reaction of spring 26 and the fluid in chamber 31 on head 27 of push rod 28 forces push rod 28, coupling member 38 and slide 22 against one another. To disassemble assembly 1, push rod 28 and coupling member 38 are disconnected from each other by simply being withdrawn axially, by virtue of member 38 being retained axially by head 44 and so moving together with slide 22. Push rod 28, member 38, and articulated joints 41 and 48, arranged in series with one another, prevent transverse components and/or torques being generated on slide 22 by spring 26 or the action of the fluid, so that slide 22 operates at all times in purely axial operating load conditions, regardless of the machining and assembly tolerances of the various components, deformation and/or load of spring 26, and fluid supply pressure.

The fact that thrust is exerted solely along axis 6 results in fast, precise movement of slide 22, and in even wear of the liner and the sliding parts of slide 22, so that actions or forces best suited to different production conditions can be imparted to operating units 2 of machine 3, thus minimizing production time and improving finished product quality.

Moreover, unlike known solutions, the fact that push rod 28 engages hole 29 in fluidtight manner means the fluid pressure acts solely on head 27 of push rod 28, as opposed to portion 24 of slide 22, so that flow of the valve assembly can be adjusted by adjusting the outside diameter of projections 22a, with no change in the reaction exerted by the fluid, which, in known solutions, varies in proportion to the variation in size of the projections. In other words, projections 22a and head 27 being adjustable independently in size, it is possible, given the fluid supply pressure, to set the reaction exerted by the fluid beforehand, regardless of the flow rate of the valve assembly, so that, unlike known solutions, the same linear actuator can be used for different flow rates of the valve assembly.

Clearly, changes may be made to valve assembly 1 as described herein without, however, departing from the scope of the present invention. In particular, one or more of the relatively moving members interposed between spring 26 and slide 22 may be formed differently from those indicated by way of example, provided they prevent forces crosswise to the sliding axis 6 of slide 22 from being transmitted by the spring and the fluid supply to slide 22, thus creating undesired, unpredictable friction components.

What is claimed is:

1. A proportional valve assembly for supplying compressed air on a glassware molding machine, the assembly comprising a tubular body having an axis and inlet and outlet ports for an operating fluid; at least one movable slide member housed in said tubular body; a linear actuator for exerting control action on said slide member; and reaction means for exerting on the slide member an opposing action in opposition to the control action, and for moving said slide member along said axis; characterized by also comprising relatively moving means interposed between said reaction means and said slide member, and said relatively moving means comprise self-leveling articulated joint means with spherical heads; and said articulated joint means comprise a first and a second spherical-headed articulated joint, said spherical heads are connected integrally to each other, and further characterized in that said relatively moving means comprise a push member separated from said slide member; and coupling means for connecting the push member to said slide member;

further characterized in that said first and said second spherical-headed articulated joint comprise respective spherical heads having respective different radii of curvature.

2. An assembly as claimed in claim 1, characterized by comprising guide means for guiding said push member along said axis.

3. An assembly as claimed in claim 1, characterized in that said coupling means comprise a single coupling body distinct from said push member and said slide member.

4. An assembly as claimed in claim 1, characterized in that said first and said second spherical-headed articulated joint are spaced apart along said axis.

5. An assembly as claimed in claim 1, characterized in that said first and said second spherical-headed articulated joint are arranged in series.

6. An assembly as claimed in claim 1, characterized in that said reaction means comprise elastic reaction means; and in that, of said spherical-headed articulated joints, the articulated joint closer to said elastic reaction means is the one with the smaller-radius spherical surface.

7. An assembly as claimed in claim 1, characterized in that said spherical heads form part of a body formed in one piece.

8. An assembly as claimed in claim 1, characterized in that said push member houses at least partly at least one of said spherical heads.

9. An assembly as claimed in claim 8, characterized in that said push member houses at least one of said spherical heads with a radial and axial clearance.

10. An assembly as claimed in claim 8, characterized in that said push member houses at least partly both said spherical heads.

11. An assembly as claimed in claim 1, characterized in that said push member is defined by an end surface on which said fluid exerts an opposing action in opposition to said control action.

12. An assembly as claimed in claim 11, characterized in that said push member has an outside diameter smaller than the inside diameter of said tubular body.

13. A proportional valve assembly for supplying compressed air on a glassware molding machine, the assembly comprising a tubular body having an axis and inlet and outlet ports for an operating fluid; at least one movable slide member housed in said tubular body; a linear actuator for exerting control action on said slide member; and reaction means for exerting on the slide member an opposing action in opposition to the control action, and for moving said slide member along said axis; characterized by also comprising relatively moving means interposed between said reaction means and said slide member, characterized in that said relatively moving means comprise a push member separated from said slide member; and said relatively moving means comprise self-leveling articulated joint means; and said articulated join means comprise a first and a second spherical-headed articulated joint, characterized in that said spherical-headed articulated joint has respective straight conical flared seats and coupling means for connecting the push member to said slide member.

14. A glassware molding machine comprising at least one operating unit, and pneumatic supply and control means for supplying said operating unit with a pressurized operating fluid; characterized in that said pneumatic supply and control means comprise at least one valve assembly, the assembly comprising a tubular body having an axis and inlet and outlet ports for an operating fluid; at least one movable slide member housed in said tubular body; a linear actuator for exerting control action on said slide member; and reaction means for exerting on the slide member an opposing action in opposition to the control action, and for moving said slide member along said axis; characterized by also comprising relatively moving means interposed between said reaction means and said slide member, and said relatively moving means comprise self-leveling articulated joint means with spherical heads; and said articulated join means comprise a first and a second spherical-headed articulated joint.

said spherical heads are connected integrally to each other, and further characterized in that said relatively moving means comprise a push member separate form said member; and coupling means for connecting the push member to said slide member;

further characterized in that said first and said second spherical-headed articulated joint comprise respective spherical heads having respective different radii of curvature.

\* \* \* \* \*